United States Patent
Calleri

(10) Patent No.: US 11,815,293 B2
(45) Date of Patent: Nov. 14, 2023

(54) METHOD FOR INSTALLING A GEOTHERMAL SYSTEM, METHOD FOR UTILIZING GEOTHERMAL ENERGY, AND GEOTHERMAL SYSTEM

(71) Applicant: Geolog S.r.l., San Giuliano Milanese (IT)

(72) Inventor: Antonio Calleri, San Giuliano Milanese (IT)

(73) Assignee: Geolog S.r.l., Milan (IT)

( * ) Notice: Subject to any disclaimer, the term of this patent is extended or adjusted under 35 U.S.C. 154(b) by 0 days.

(21) Appl. No.: 17/853,958

(22) Filed: Jun. 30, 2022

(65) Prior Publication Data

US 2023/0011174 A1 Jan. 12, 2023

(30) Foreign Application Priority Data

Jul. 6, 2021 (IT) .......................... 102021000017711

(51) Int. Cl.
*F24T 10/10* (2018.01)
*F24T 10/00* (2018.01)

(52) U.S. Cl.
CPC ............ *F24T 10/10* (2018.05); *F24T 2010/53* (2018.05)

(58) Field of Classification Search
CPC ....... F24T 10/10; F24T 2010/53; F24T 10/13; Y02E 10/10; E21B 7/20; E21B 7/28

(Continued)

(56) References Cited

U.S. PATENT DOCUMENTS 6,301,894 B1 10/2001 Halff
9,109,398 B2 8/2015 Harris et al.
(Continued)

FOREIGN PATENT DOCUMENTS

| DE | 102008011780 | | 9/2009 |
|---|---|---|---|
| EP | 3582925 | * | 8/2021 |
| WO | WO 2020/229901 | | 11/2020 |

OTHER PUBLICATIONS

Rapporto di Ricerca e l'Opinione Scritta [Search Report and Written Opinion] dated Mar. 17, 2022 From the Ministero Dello Sviluppo Economico, Direzione Generale Sviluppo Produttivo e Competitivita, Ufficio Italiano Brevetti e Marchi Re. Application No. IT 202100017711. (7 Pages).

*Primary Examiner* — Hoang M Nguyen

(57) ABSTRACT

Method for installing a geothermal system, comprising: arranging a drilling equipment, including a support structure and a terminal module, mounted on the support structure; by means of the drilling equipment, drilling the soil in succession along a substantially vertical first tract, a substantially horizontal second tract and a substantially vertical third tract, the first, second and third tracts forming a substantially U-shaped well, the first tract having a surface inlet, where the drilling is started, the third tract having a surface outlet, where the drilling is finished, the well crossing a geothermal zone; arranging a casing in the well, so that the casing extends between the inlet of the first tract and the outlet of the third tract; arranging a heat utilization system, associated with an axial end of the casing; arranging a hydraulic system configured to cause a heat transfer fluid to circulate in the casing, so that the heat transfer fluid will absorb heat from the geothermal formation and will release it at the heat utilization system.

6 Claims, 6 Drawing Sheets

(58) Field of Classification Search
USPC .............................................. 60/641.2–641.4
See application file for complete search history.

(56) References Cited

U.S. PATENT DOCUMENTS

| | | |
|---|---|---|
| 11,002,074 B1 * | 5/2021 | Calleri .................. E21B 21/103 |
| 2005/0121169 A1 | 6/2005 | McNair |
| 2012/0080163 A1 | 4/2012 | Hoffman |
| 2017/0130703 A1 * | 5/2017 | Muir ........................ F24T 10/10 |
| 2019/0128068 A1 * | 5/2019 | Danko .................. E21B 47/022 |
| 2019/0145666 A1 | 5/2019 | Berman |
| 2020/0182019 A1 * | 6/2020 | Wang ...................... E21B 43/38 |

* cited by examiner

METHOD FOR INSTALLING A GEOTHERMAL SYSTEM, METHOD FOR UTILIZING GEOTHERMAL ENERGY, AND GEOTHERMAL SYSTEM

RELATED APPLICATION

This application claims the benefit of priority of Italy Patent Application No. 102021000017711 filed on Jul. 6, 2021, the contents of which are incorporated by reference as if fully set forth herein in their entirety.

FIELD AND BACKGROUND OF THE INVENTION

The present invention relates to a method for installing a geothermal system.

The present invention further relates to a method for utilizing geothermal energy.

As is known, in the subsoil there may be zones having a particularly high temperature (e.g. 250° C.-300° C.).

In some of the solutions for geothermal energy utilization that are currently available, hot water is extracted from the formation and then fed back thereto after it has reached the surface and yielded its heat.

The Applicant observes, however, that waters in hot formations often contain highly corrosive metals and minerals, and may create deposits in the exchangers' pipes, resulting in very high costs to be incurred for maintaining geothermal wells. Moreover, production of hot water and re-injection of low-temperature water into the formations may lead to microseismic problems. In addition to the above, it may happen that the aquifer is either not present or rapidly consumed, so that the geothermal well has to be closed and abandoned—which situation is particularly disadvantageous, given the costs to be incurred for drilling, operating and closing the well.

Document US 2017/130703 A1 describes techniques for identifying zones where the soil should be drilled in order to create a geothermal well. However, this document provides no definite indications as to the construction of the well and of the system.

Document US 2012/0174581 A1 describes the use of abandoned wells for geothermal energy utilization. More in detail, a first drilling is executed, starting from a first well, until a geothermal formation is reached; once arrived near the desired zone, the drill pipes are extracted from the first well and a first casing is inserted. A second drilling is then executed, starting from a second well, until the same geothermal formation, and in particular the end point of the first drilling, is reached. After removing the drill pipes from the second well, a recovery system is inserted into the second well to reach the casing inserted in the first well and pull the casing through the second well.

The Applicant observes that the technique described in US 2012/0174581 A1 turns out to be very complex and requires a considerable number of steps that, as a whole, are very time-consuming.

SUMMARY OF THE INVENTION

It is one object of the present invention to permit the installation of a geothermal system that does not need the presence of an aquifer in the formation, thus avoiding the above-mentioned problems of corrosion and deposits in the pipes as well as any problems related to the possible exhaustion of the aquifer.

It is a further object of the present invention to provide a geothermal system including a closed U-shaped casing, which will not disturb to the geological formation and will not give rise to any microseismicity-related risks and problems.

It is a last object of the present invention to provide a technique for installing a geothermal system that can be executed in a simple and relatively quick manner, thus having a limited impact on the overall costs of the project.

According to a first aspect, the invention relates to a method for installing a geothermal system.

Preferably, the method comprises arranging a drilling equipment.

Preferably, the drilling equipment includes a support structure.

Preferably, the drilling equipment includes a terminal module.

Preferably, the terminal module is mounted on said support structure.

Preferably, the method comprises drilling the soil by means of said drilling equipment.

Preferably, said drilling is executed in succession along a substantially vertical first tract, a substantially horizontal second tract and a substantially vertical third tract.

Preferably, said first, second and third tracts form a substantially U-shaped well.

Preferably, said first tract has a surface inlet, where said drilling is started.

Preferably, said third tract has a surface outlet, where said drilling is finished.

Preferably, said well crosses a geothermal zone GZ.

Preferably, the method comprises arranging a casing in said well.

Preferably, said casing extends between the inlet of said first tract and the outlet of said third tract.

Preferably, the method comprises arranging a heat utilization system.

Preferably, the heat utilization system is associated with an axial end of said casing.

Preferably, the method comprises arranging a hydraulic system configured to cause a heat transfer fluid to circulate in said casing, so that said heat transfer fluid will absorb heat from said geothermal zone and will release it at said heat utilization system.

Preferably, said casing is housed in said well during the drilling by using a Directional Casing Drilling technique.

Alternatively, housing the casing in the well comprises constraining the casing, at the end of the drilling phase, to said support structure.

Preferably, housing the casing in the well comprises extracting the support structure from the inlet of said first tract, thereby dragging said casing into said well, so that said casing will extend between the inlet of said first tract and the outlet of said third tract.

Preferably, prior to constraining the casing to the support structure, the terminal module is removed.

Preferably, constraining the casing to the support structure comprises arranging a connection element.

Preferably, the connection element is provided with a main body having a first end and a second end.

Preferably, the connection element can be made integral with said casing and can rotate unconstrained from the support structure.

Preferably, constraining the casing to the support structure comprises connecting the first end of the main body to the support structure.

Preferably, said main body has, at its first end, a joint for rotatably decoupling said casing and said support structure.

Preferably, constraining the casing to the support structure comprises connecting the second end of the main body to the casing.

Preferably, said main body has an inner chamber and a plurality of holes putting said inner chamber in fluidic communication with the outside.

Preferably, connecting the first end of the main body to the support structure comprises putting said inner chamber in fluidic communication with a radially internal cavity of one or more pipes of said terminal segment.

Preferably, said method comprises, during the step of extracting the support structure from the inlet of the first tract, causing a lubricating material to flow through said support structure, so that said lubricating material will flow into the radially internal axial cavity of one or more pipes of said terminal segment, reach the inner chamber of the main body, and exit through said holes.

Preferably, said casing comprises a plurality of portions, which are progressively mounted as the casing is housed in the well.

According to a second aspect, the invention relates to a method for utilizing geothermal energy.

Preferably, said method for utilizing geothermal energy comprises installing a geothermal system by following the method for installing a geothermal system.

Preferably, said method for utilizing geothermal energy comprises activating said hydraulic system to cause a heat transfer fluid to flow in said casing, so that said heat transfer fluid will absorb heat from said geothermal zone and will release it at said heat utilization system.

Preferably, said method for utilizing geothermal energy comprises activating said heat utilization system.

Preferably, the heat transfer fluid exiting said heat utilization system is supplied back into said casing to reach said geothermal zone and absorb heat again.

According to a third aspect, the invention relates to a geothermal system installed in accordance with said method for installing a geothermal system and preferably operating in accordance with said method for utilizing geothermal energy.

BRIEF DESCRIPTION OF THE SEVERAL VIEWS OF THE DRAWINGS

Further features and advantages will become more apparent in the light of the following detailed description of a preferred, but non-limiting, embodiment of the invention. Such description is provided herein with reference to the annexed drawings, which are also supplied by way of non-limiting example, wherein.

DESCRIPTION OF SPECIFIC EMBODIMENTS OF THE INVENTION

Figure 1:
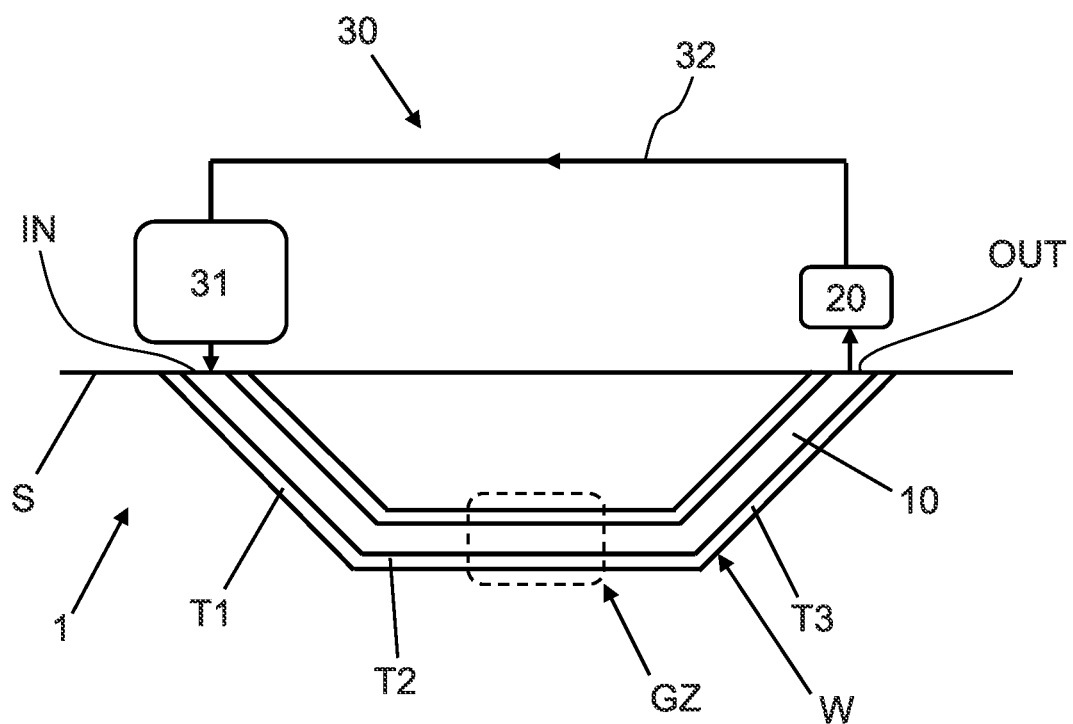
FIG. 1 schematically shows a geothermal system made in accordance with the present invention.

With reference to the annexed drawings, reference numeral 1 designates a geothermal system made in accordance with the present invention.

The system 1 comprises a well W, which extends into the subsoil.

The well W comprises: a substantially vertical first tract T1; a substantially horizontal second tract T2; a substantially vertical third tract T3.

The first tract T1 has an inlet IN; the third tract T3 has an outlet OUT. In FIG. 1, reference S represents the ground surface.

The well W, and particularly the second tract T2, crosses a geothermal zone GZ.

Note that, when used with reference to the tracts T1-T3, "substantially vertical" or "substantially horizontal" means having, respectively, a significant horizontal or vertical component.

In practical terms, the first tract T1 shows an increased depth along its development, so that from the inlet IN it is possible to approach the geothermal zone GZ. As aforesaid, the first tract T1 may not be precisely vertical.

The second tract T2 preferably crosses the geothermal zone GZ and develops away from the first tract T1—possibly with depth changes, which nevertheless will not affect the operation of the system as a whole.

The third tract T3 shows a progressive depth reduction along its development, until it reaches the outlet OUT. As aforesaid, the third tract T3 may not be precisely vertical.

In summary, the well W is structured in such a way that it reaches a certain depth, crosses the geothermal zone GZ, and then runs back up to the surface.

The well W may have variable depths as a function of the actual location of the geothermal zone GZ.

A casing 10 is arranged in the well W. The casing 10 is made of corrosion-resistant material, e.g. steel, alloy, polymeric or composite material.

The casing 10 extends continuously from the inlet IN of the first tract T1 to the outlet OUT of the third tract T3.

The casing 10 is preferably made up of a plurality of portions or single pipes, which are axially joined together to extend throughout the length of the well W.

A heat transfer fluid is made to flow through the casing 10. The heat transfer fluid performs the task of absorbing heat from the geothermal zone GZ and bringing it to the surface, where it can then be utilized.

For this purpose, the system 1 comprises a heat utilization system 20.

In one embodiment, the heat utilization system 20 may comprise an apparatus for hydrogen generation (in this case, for "green H2" generation, since hydrogen is generated by using a renewable energy source), e.g. operating by electrolysis, positioned downstream of said exchanger. In other words, the heat transfer fluid exiting the exchanger may be supplied to the green H2 generator.

In one embodiment, the heat utilization system 20 may comprise further devices, preferably connected downstream of the green H2 generator, capable of exploiting the residual heat for civil heating and/or agricultural applications.

Figure 10:
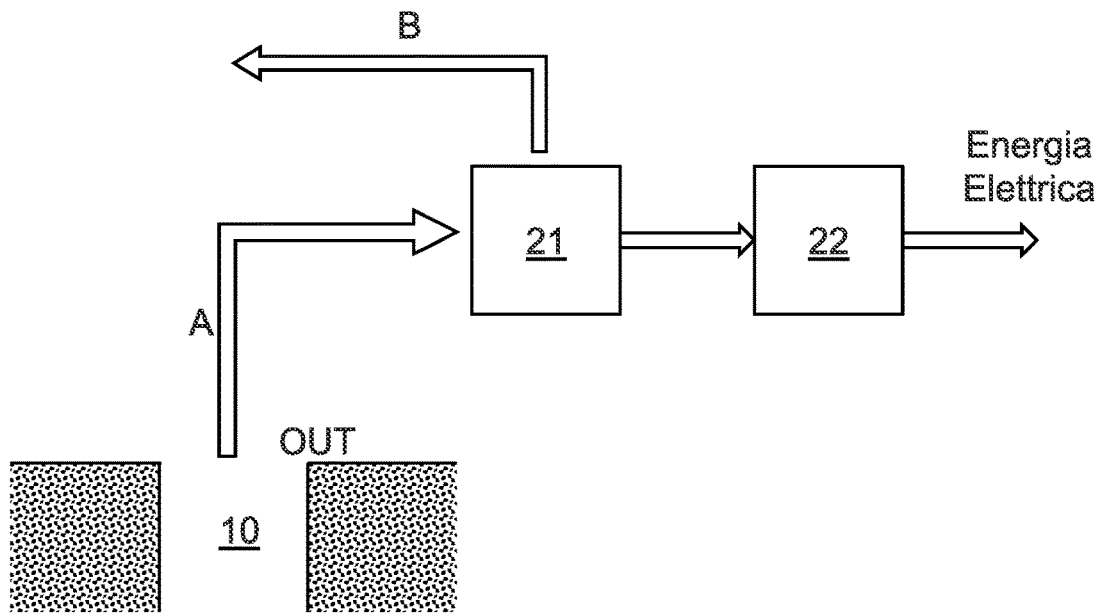
FIGS. 10-11 schematically show some possible operating configurations of parts of a system according to the present invention.

In one embodiment, the heat transfer fluid coming from the casing 10 is directly used by the heat utilization system 20. For example, the heat transfer fluid may be delivered to a turbine connected to an electric generator, for converting heat into electric energy. In the diagram of FIG. 10, arrow "A" represents the high-temperature heat transfer fluid coming from the casing 10, reference 21 represents a turbine, arrow "B" represents the heat transfer fluid at a lower temperature, which can be made to recirculate in the casing 10 from the opposite end (possibly after having been used for other applications requiring less heat than the turbine), and reference 22 represents an electric generator, which exploits the mechanical motion of the turbine in order to generate electric energy.

Figure 11:
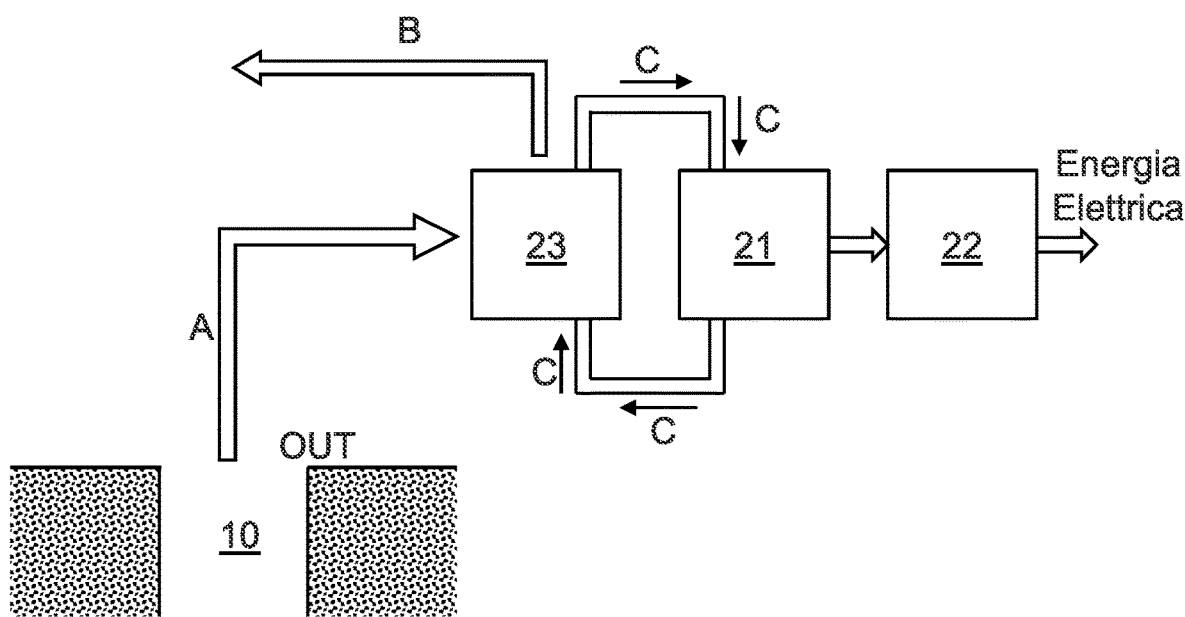

In one embodiment, the heat utilization system 20 is provided with an exchanger, where the heat transfer fluid coming from the casing 10 yields heat to another fluid, and the latter is used in a turbine to be converted into electric energy and/or in the green H2 generator and/or in further devices utilizing such heat for civil heating and/or agricultural applications. In the diagram of FIG. 11, arrow "A" represents the high-temperature heat transfer fluid coming from the casing 10, reference 23 represents an exchanger, arrow "B" represents the heat transfer fluid at a lower temperature, which can be made to recirculate in the casing 10 from the opposite end; reference 21 represents a turbine, and arrows "C" represents the path followed by a fluid other than the heat transfer fluid circulating in the casing 10 and used in the heat utilization system 20. The turbine 21 supplies mechanical energy that is exploited by the electric generator 22 in order to generate electric energy. Note that the path defined by arrows "C" may also be more articulated than this, and reach other apparatuses/devices included in the system 20—as previously described.

The heat transfer fluid returning from the heat utilization system 20 is delivered back into the casing 10, so that it will return near the geothermal formation GF and absorb heat again.

The Applicant observes that, by way of example, the heat transfer fluid exiting the casing 10 may have a temperature close to that of the hot geological formation; the temperature of the heat transfer fluid exiting the exchanger for electric energy generation will be lower, but still sufficient for other uses.

The heat transfer fluid is circulated by a hydraulic system 30, which preferably comprises a pumping apparatus 31 and a recirculation branch 32 that connects the heat utilization system 20 to the pumping apparatus 31.

Note that the positions of the recirculation branch 32 and pumping apparatus 31 shown in FIG. 1 are merely exemplificative; for instance, the pumping apparatus 31 may be positioned otherwise, e.g. upstream of the recirculation branch 32, whenever it should be deemed to be more comfortable or convenient.

Note also that the heat utilization system 20 is shown to be positioned near the outlet OUT of the third tract T3 merely by way of example. The heat utilization system 20 may be positioned anywhere as required or convenient.

It should also be noted that the heat transfer fluid is shown herein to flow from the inlet IN of the first tract T1 to the outlet OUT of the third tract T3 (and then be recirculated to flow back to the inlet IN of the first tract T1) merely by way of example. As a matter of fact, the system can operate in much the same manner with the heat transfer fluid circulating in the opposite direction.

The system 1 can be installed as described below.

Figure 2:
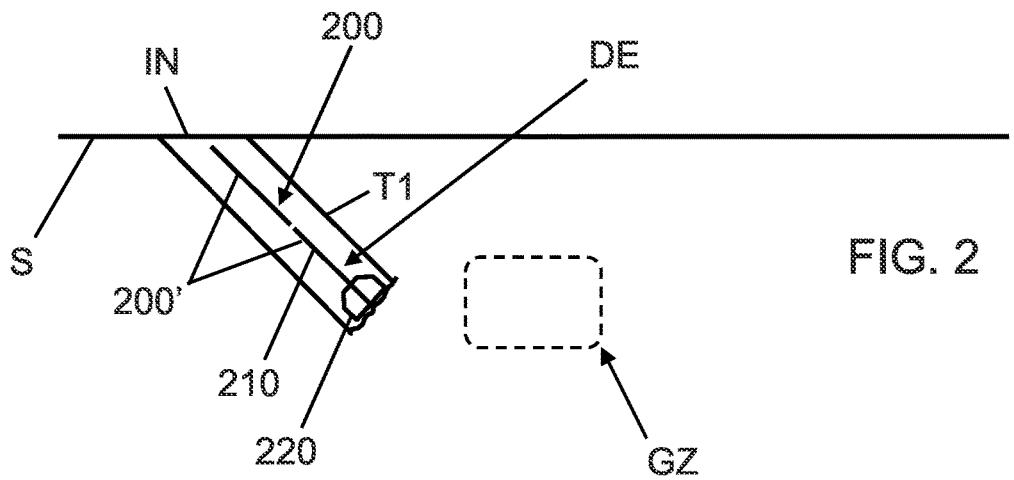
FIGS. 2, 3 and 4 schematically show a first set of steps of a method according to the present invention.

The substantially vertical first tract T1 is drilled first, starting from the inlet IN—which, in practice, is the point where the drilling begins (FIG. 2).

Figure 3:
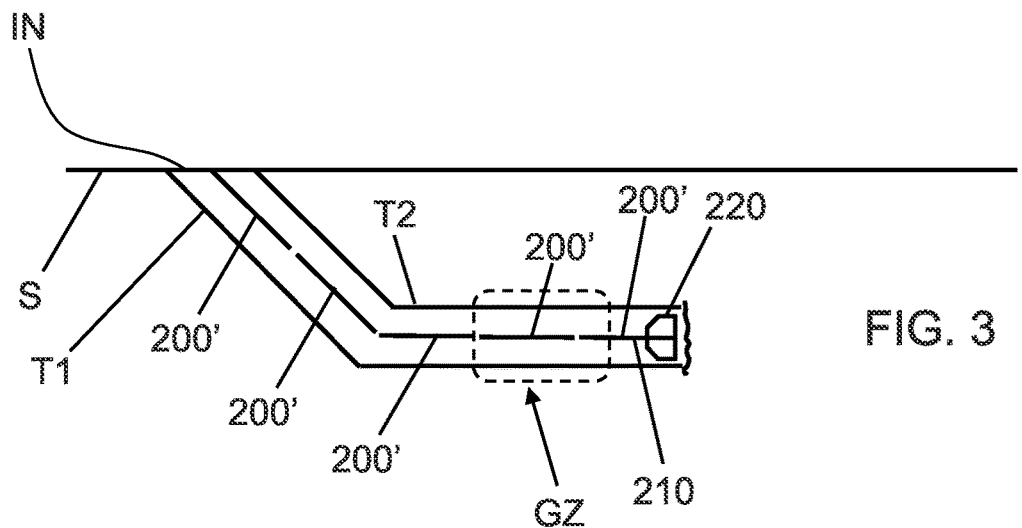

When the necessary depth (that is, approximately the depth of the geothermal zone GZ) is reached, the drilling direction is changed considerably and the drilling proceeds in a substantially horizontal direction, thus generating the second tract T2 (FIG. 3).

Figure 4:
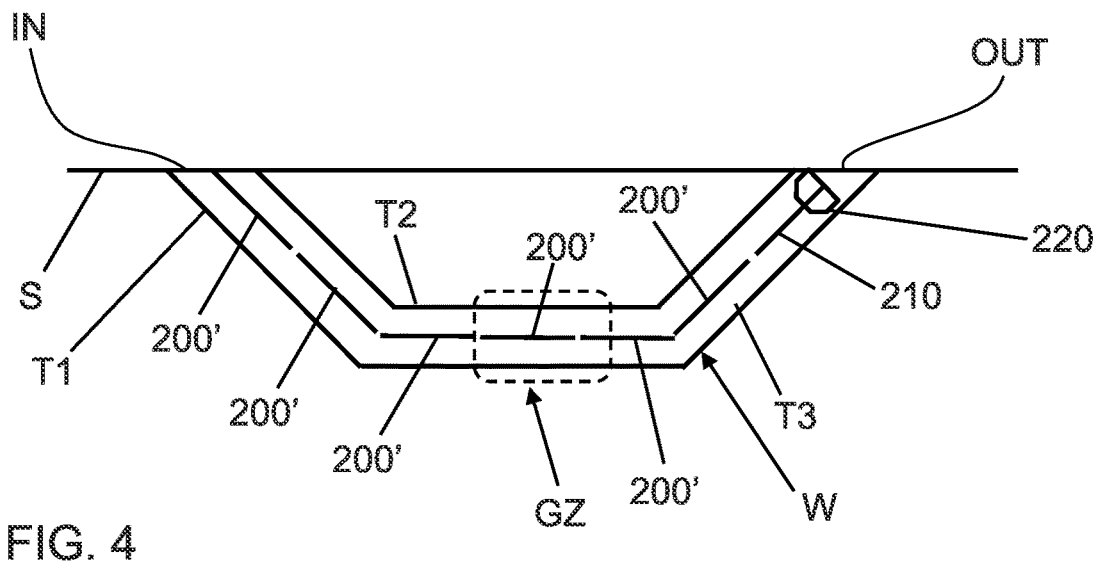

After crossing the geothermal zone GZ, the drilling direction is changed again, returning towards the surface and thus generating the third tract T3. The well W is substantially finished when the outlet OUT of the third tract T3 is reached (FIG. 4).

The drilling of the first, second and third tracts T1-T3 is performed in a per se known manner. In brief, a drilling equipment DE is used.

The drilling equipment DE comprises a support structure 200, preferably made up of a plurality of segments 200'; each segment 200' may consist of one or more drill pipes (drill stand). The support structure 200 has a first end, which remains on the surface and is associated with the units/devices that perform and control the drilling operations. The support structure 200 has a second end, opposite to the first end. The last segment 210 at the second end is referred to as "terminal segment". A terminal module 220 is constrained to the terminal segment 210.

For example, the terminal module 220 may be a drill bit. A drive unit (not shown) installed on the surface imparts pressure and rotational motion to the support structure 200, which are then transferred by the latter to the drill bit to perform the drilling.

In one embodiment, the use of a drill bit (e.g. like the one mentioned above) may complement the use of an NSD (Non-Stop Drilling) method. Such method makes it possible to avoid interrupting the circulation of the drilling fluid, thus limiting the rise in the temperature of the drill bit whenever a new segment needs to be added to the support structure 200. By way of example, the technology described in U.S. Pat. No. 11,002,074 may be used.

Within the scope of the present invention, other drilling techniques may be employed as well, e.g. laser drilling combined with mechanical drilling (i.e. using a drill bit).

The Applicant observes that laser drilling, when combined with mechanical drilling, works by transferring luminous energy from the surface (above ground) to the rocky formation, thereby fracturing and weakening it, while the drill bit removes the rocky debris. The support structure 200 may comprise, in this case, all the wiring necessary for carrying the beams to the point where drilling must take place.

It is envisaged that during the drilling, in a per se known manner, drilling mud is fed to the support structure (and in particular to the pipes making up the various segments), which will then come out at the terminal module 220.

As aforesaid, the well W is drilled starting from the inlet IN of the first tract T1, until the outlet OUT of the third tract T3 is reached.

In the well W a casing 10 is positioned.

In one embodiment, the casing 10 is progressively positioned during the drilling, e.g. by using a Directional Casing Drilling technique. A technology of this kind is described, for example, in the scientific article "*A review on casing while drilling technology for oil and gas production with well control model and economical analysis*", Dipal Patel et al., published in "Petroleum", Volume 5, Issue 1, March 2019, Pages 1-12, available at the following link: https://www(dot)sciencedirect(dot)com/science/article/pii/S2405656118301329, (last access on Jul. 2, 2021).

In one embodiment, the casing 10 is positioned in the well W at the end of the drilling phase.

More in detail, once the terminal module 220 has emerged from the outlet OUT of the third tract T3, the casing 10 is constrained to the support structure 200, in particular to the terminal segment 210 thereof.

In one embodiment, prior to constraining the casing 10 to the support structure 200, the terminal module 220 is removed.

Figure 8:
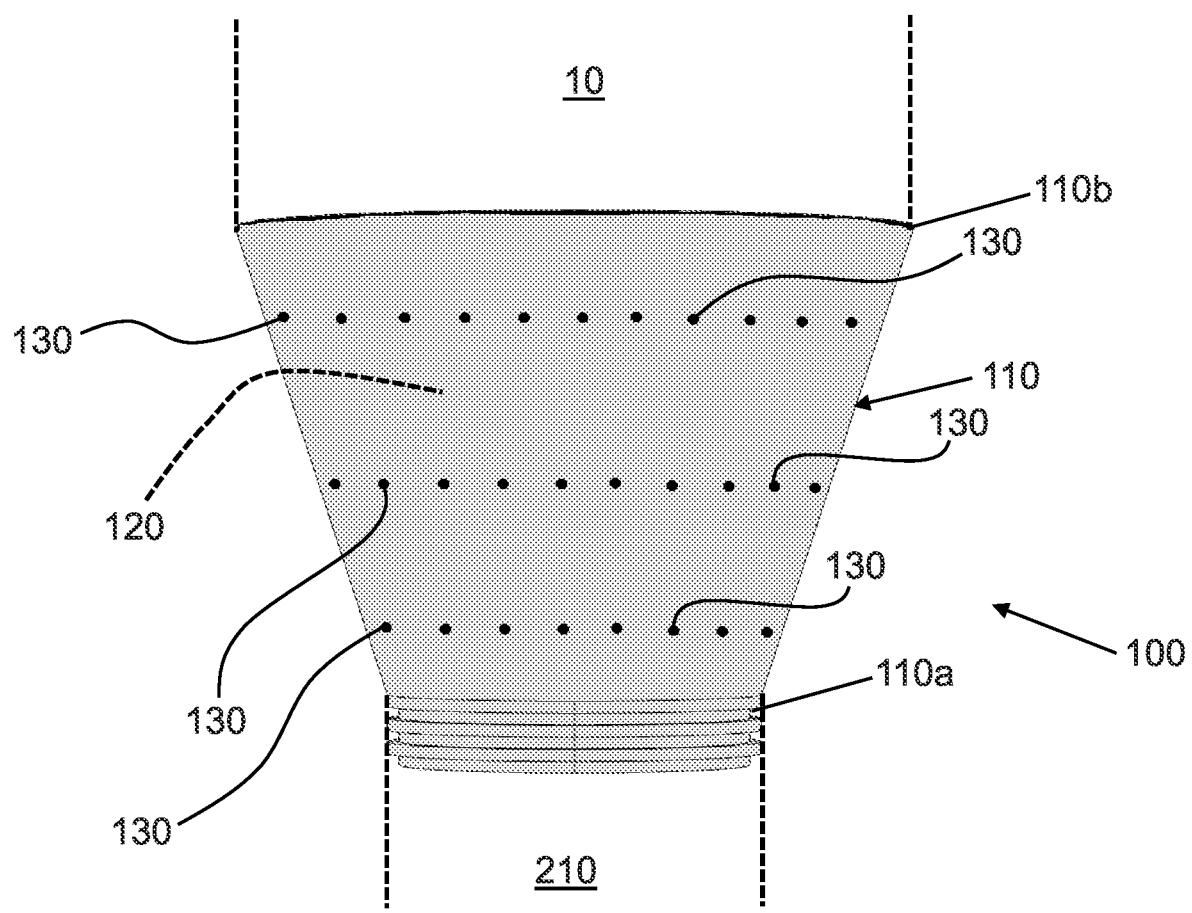
FIGS. 8-9 schematically show an exemplary embodiment of an element that can be used in the method according to the present invention.
Figure 9:
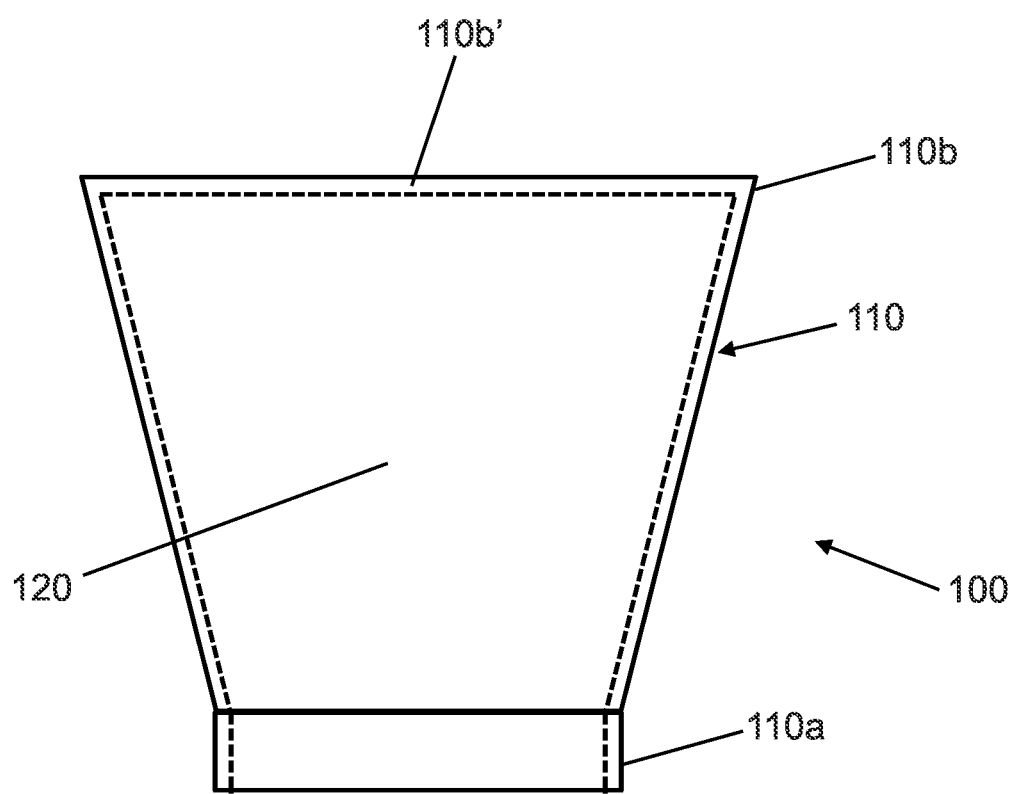

For example, a connection element 100 may be arranged, e.g. like the one shown in FIGS. 8-9.

The connection element 100 is provided with a main body 110 having a first end 110a and a second end 110b. The first end 110a of the main body 110 is connected to the support structure 200, and in particular to the terminal segment 210. The second end 110b of the main body 110 is connected to the casing 10.

Preferably, the main body 110 of the connection element has an inner chamber 120 and a plurality of holes 130 putting the inner chamber in fluidic communication with the outside.

The connection between the first end 110a of the main body 110 and the support structure 200 puts the inner chamber 120 in fluidic communication with the radially internal cavity of one or more pipes of the terminal segment 210.

The first end 110a is preferably provided with a thread, so that it can be coupled to a matching thread at the end of the terminal segment 210 in order to constrain the connection element 100 to the support structure 200 by screwing. The thread of the first end 110a is preferably substantially equal to the thread that is present on an engagement portion of the terminal module 220 (e.g. the drill bit). Through its engagement portion, the terminal module 220 is constrained to the terminal segment 210 of the support structure 200.

The first end 110a is preferably open, so that any fluid flowing through the terminal segment 210 of the support structure 200 (coming from the surface equipment and guided towards the terminal segment 210 by the other segments of the support structure 200) will be able to reach the internal cavity 120 through the first end 110a.

Preferably, the second end 110b is not threaded. In a preferred embodiment, the connection to the casing 10 is effected by welding.

The second end 110b is preferably closed, so that any fluid that may be present in the inner chamber 120 will not be allowed to exit through the second end 110b itself. In practical terms, the wall 110b' schematically shown in FIG. 9 has no holes or openings.

As schematically shown in FIGS. 8-9, the main body 110 of the connection element 100 may have a substantially truncated conical shape (with the cross-section of the first end 110a smaller than the cross-section of the second end 110b). However, it may have different conformations as well.

Once the casing 10 has been constrained to the terminal segment 210, the support structure 200 is extracted from the inlet IN of the first tract T1. During such extraction, the support structure 200 will drag the casing 10 into the well W, and the casing 10 will then extend from the inlet IN of the first tract T1 to the outlet OUT of the third tract T3.

The support structure 200 is extracted from the same aperture (e.g. the inlet IN of the first tract T1) through which it was inserted during the drilling phase.

Figure 5:
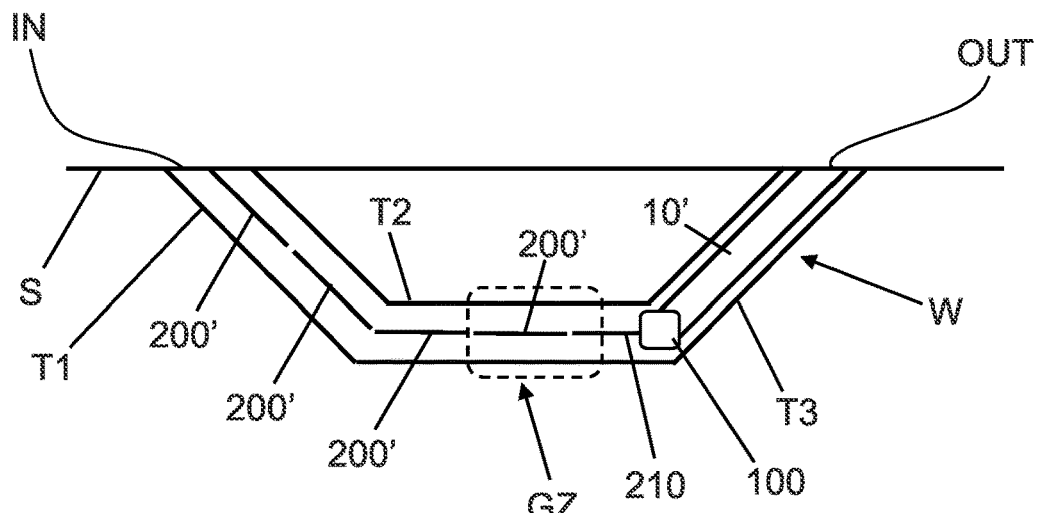
FIGS. 5, 6 and 7 schematically show a second set of steps of a method according to the present invention.
Figure 6:
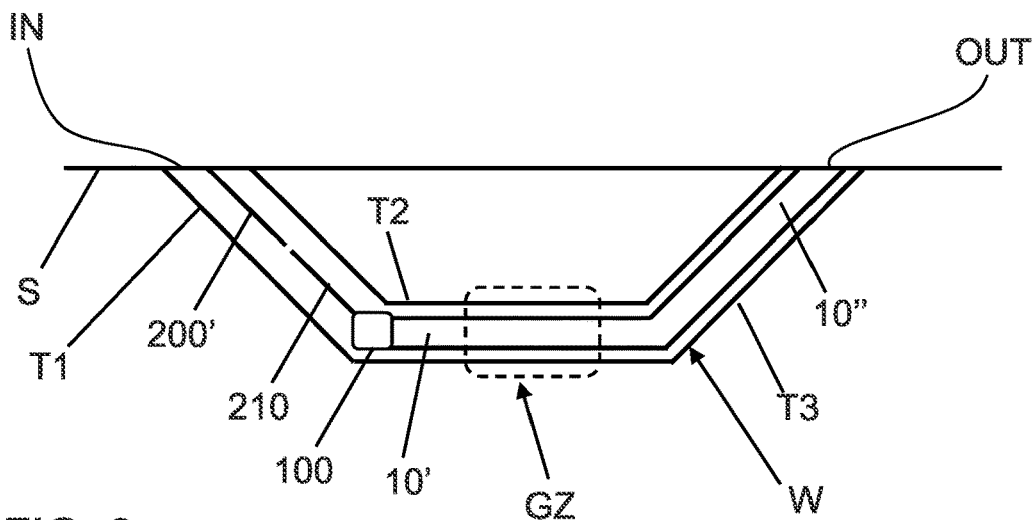
Figure 7:
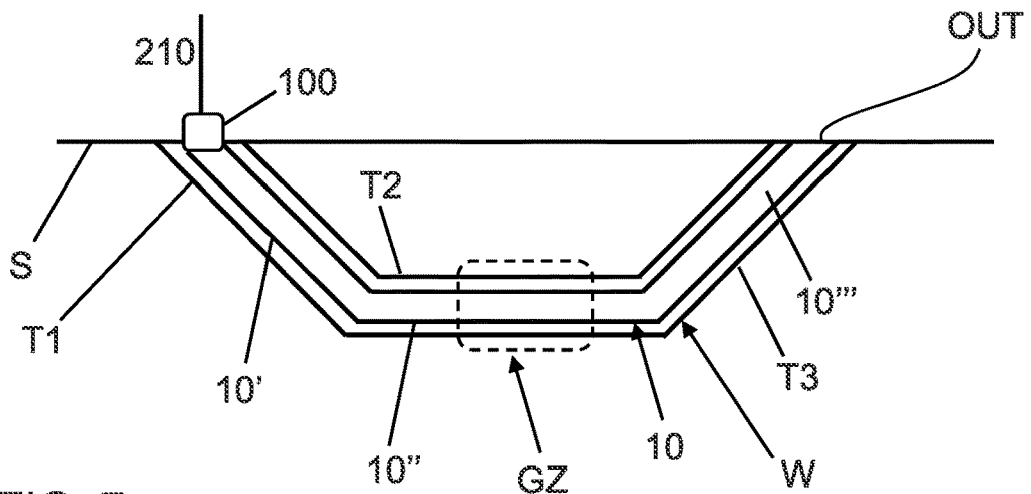

FIGS. 5-7 show the progressive extraction of the support structure 200 from the well W, which drags along the tracts 10', 10" and 10''' of the casing 10.

As aforementioned, the casing 10 is preferably made up of a plurality of portions or single pipes, which are axially joined together to extend throughout the length of the well W. Preferably, the various portions are added progressively in succession as the casing is dragged by the support structure 200 during the extraction phase.

In one embodiment, each portion of the casing 10 is secured to the preceding portion and/or to the following portion by welding. By way of example, a laser welding technique may be used, as described in European patent application EP 3 582 925, the contents of which are wholly incorporated herein by reference. In a different exemplary embodiment, a MIG (Metal-arc Inert Gas) or MAG (Metal-arc Active Gas) continuous wire welding technique may be employed.

It should be noted that the support structure 200 is extracted from the well W by using equipment that is per se known (and that therefore will not be described in detail herein), as usually employed for removing the support structure 200 and the terminal module 220 at the end of a drilling operation.

During the extraction phase, the casing 10 may be made to rotate in order to facilitate the dragging. Such rotation is imparted by means of a structure positioned at the outlet OUT of the tract T3.

Preferably, the connection element 100 is integral with the casing 10. In this manner, if a rotation is to be imparted to the casing 10, such rotation will be applied to the connection element 100 as well. For example, as aforesaid, the second end 110b of the main body 110 is welded to the casing 10.

Preferably, the rotation to which the casing 10 is subjected is not transmitted to the support structure 200.

In particular, the main body 110 may include, at its first end 110a, a joint for rotatably decoupling the casing 10 (and that part of the connection element 100 that is integral therewith) and the support structure 200.

Preferably, during the phase of extracting the support structure 200 from the inlet IN of the first tract T1, it is possible to cause a lubricating material to flow through the support structure 200; in particular, such lubricating material will flow in the radially internal cavity of one or more pipes of the terminal segment 210 and reach the inner chamber 120 of the main body 110 of the connection element 100 (as aforesaid, the inside of the pipes and the inner chamber 120 are in fluidic communication); due to the fact that the second end 110b of the main body 110 is closed, the lubricant can only escape through the holes 130, fitted with nozzles, and out into the well W, thus facilitating the sliding of the casing 10 along the well W.

The lubricant used during the drilling phase and/or the extraction phase is advantageously selected by taking into account the temperature and the lithological conditions in which the system has to operate. By way of example, it is possible to use commercially available drilling fluids, air, water-based aerated muds or foams, possibly along with cooled radiators in order to lower the fluid temperature.

Preferably, in order to feed the lubricant during the extraction phase, it is possible to use the same equipment already used for feeding drilling fluid during the drilling phase.

The Applicant observes that, whether the casing 10 is positioned while drilling the well (i.e. positioned gradually during the drilling phase) or at the end of the drilling phase, only one drilling operation is essentially carried out, from the inlet IN of the first tract T1 to the outlet OUT of the third tract T3.

Once the casing 10 has been inserted in the well W, a cementation operation is preferably carried out in order to stabilize the casing 10 and hold it in position. The cementation material is injected between the outer surface of the casing 10 and the inner surface of the well W. The injection operation may be executed from the inlet IN of the first tract T1 and/or from the outlet OUT of the third tract T3.

The method according to the invention envisages the installation of a heat utilization system 20, preferably after the casing 10 has been positioned in the well W.

The heat utilization system 20 is associated with either one of the axial ends of the casing 10; it can thus receive the heat transfer fluid that, after having crossed the geothermal formation GF, flows up along the casing 10. Depending on design choices and surrounding conditions, the heat utilization system 20 may be associated with either the axial end of the casing 10 at the inlet IN of the first tract T1 or the axial end of the casing 10 at the outlet OUT of the third tract T3.

The method according to the present invention envisages the installation of a hydraulic system 30 in order to cause the heat transfer fluid to circulate in the casing 10, so that the heat transfer fluid will absorb heat from the geothermal formation GF and will release it at the heat utilization system 20.

As aforesaid, the heat transfer fluid may be made to circulate either from the inlet IN of the first tract T1 to the outlet OUT of the third tract T3 or from the outlet OUT of the third tract T3 to the inlet IN of the first tract.

It should be noted that the annexed drawings are merely exemplificative and schematically represent some aspects of the invention. The mutual proportions between the various elements shown (or between different dimensions of a single element) are not necessarily real: some dimensions may have been increased/reduced, e.g. for ease of representation.

What is claimed is:

1. Method for installing a geothermal system, comprising:
    arranging a drilling equipment, including a support structure and a terminal module, mounted on said support structure;
    by means of said drilling equipment, drilling the soil in succession along a substantially vertical first tract, a substantially horizontal second tract and a substantially vertical third tract, said first, second and third tracts forming a substantially U-shaped well, said first tract having a surface inlet, where said drilling is started, said third tract having a surface outlet, where the drilling is finished, said well crossing a geothermal zone;
    arranging a casing in said well, so that said casing extends between the inlet of said first tract and the outlet of said third tract;
    arranging a heat utilization system, associated with an axial end of said casing;
    arranging a hydraulic system configured to cause a heat transfer fluid to circulate in said casing, so that said heat transfer fluid will absorb heat from said geothermal zone and will release it at said heat utilization system
    wherein housing the casing in the well comprises:
    at the end of said drilling phase, constraining the casing to said support structure;
    extracting, from the inlet of said first tract, the support structure, thereby dragging said casing into said well, so that said casing will extend between the inlet of said first tract and the outlet of said third tract,
    wherein constraining the casing to the support structure comprises:
    arranging a connection element, provided with a main body having a first end and a second end;
    connecting the first end of the main body to the support structure;
    connecting the second end of the main body to the casing.

2. Method according to claim 1, wherein, prior to constraining the casing to the support structure, the terminal module is removed.

3. Method according to claim 1, wherein said main body has an inner chamber and a plurality of holes putting said inner chamber in fluidic communication with the outside, wherein connecting the first end of the main body to the support structure comprises putting said inner chamber in fluidic communication with a radially internal axial cavity of one or more pipes of said terminal segment.

4. Method according to claim 3, comprising, during the step of extracting the support structure from the inlet of the first tract, causing a lubricating material to flow through said support structure, so that said lubricating material will flow into the radially internal axial cavity of one or more pipes of said terminal segment, reach the inner chamber of the main body, and exit through said holes.

5. Method according to claim 1, wherein said main body has, at said first end, a joint for rotatably decoupling said casing and said support structure.

6. Method according to claim 1, wherein said casing comprises a plurality of portions, which are progressively mounted as the casing is housed in the well.

\* \* \* \* \*